(12) United States Patent
Sonnekalb

(10) Patent No.: US 10,785,031 B2
(45) Date of Patent: Sep. 22, 2020

(54) DATA ENCRYPTION OF A STORAGE AREA

(71) Applicant: Infineon Technologies AG, Neubiberg (DE)

(72) Inventor: Steffen Sonnekalb, Munich (DE)

(73) Assignee: Infineon Technologies AG, Neubiberg (DE)

(*) Notice: Subject to any disclaimer, the term of this patent is extended or adjusted under 35 U.S.C. 154(b) by 184 days.

(21) Appl. No.: 14/604,187

(22) Filed: Jan. 23, 2015

(65) Prior Publication Data

US 2015/0215129 A1 Jul. 30, 2015

(30) Foreign Application Priority Data

Jan. 24, 2014 (DE) .................. 10 2014 000 986

(51) Int. Cl.
| | | |
|---|---|---|
| H04L 29/06 | (2006.01) | |
| H04L 9/32 | (2006.01) | |
| H04L 9/08 | (2006.01) | |
| G09C 1/00 | (2006.01) | |
| G06F 12/14 | (2006.01) | |

(52) U.S. Cl.
CPC ........ H04L 9/3228 (2013.01); G06F 12/1408 (2013.01); G09C 1/00 (2013.01); H04L 9/0861 (2013.01); H04L 9/0894 (2013.01)

(58) Field of Classification Search
CPC . H04L 9/0656; H04L 63/067; H04L 63/0428; H04L 9/0861; H04L 9/3228; H04L 9/0894; G06C 1/00; G06F 12/1408
See application file for complete search history.

(56) References Cited

U.S. PATENT DOCUMENTS

| | | | | |
|---|---|---|---|---|
| 4,633,036 A | * | 12/1986 | Hellman | H04L 9/302 380/277 |
| 8,370,648 B1 | * | 2/2013 | Natanzon | H04L 63/068 380/277 |
| 9,281,943 B1 | * | 3/2016 | Bailey | H04L 9/22 |
| 9,520,991 B2 | * | 12/2016 | Krummel | G06F 21/73 |
| 9,811,476 B2 | * | 11/2017 | Maeda | G06F 21/62 |
| 9,892,036 B2 | * | 2/2018 | Shin | G06F 12/0246 |
| 2004/0230799 A1 | * | 11/2004 | Davis | H04L 9/0643 713/169 |
| 2006/0129627 A1 | * | 6/2006 | Phillips | H04L 63/10 709/200 |
| 2009/0034733 A1 | * | 2/2009 | Raman | H04L 9/32 380/277 |
| 2009/0319801 A1 | | 12/2009 | Aciicmez et al. | |
| 2010/0191982 A1 | | 7/2010 | Goto | |
| 2011/0238989 A1 | * | 9/2011 | Machani | H04L 9/0637 713/168 |
| 2012/0198241 A1 | * | 8/2012 | O'Hare | H04L 63/0428 713/189 |

(Continued)

OTHER PUBLICATIONS

Whatis.com, "What is P/E cycle", Jan. 2012, http://searchstorage.techtarget.com/definition/P-E-cycle.*

(Continued)

*Primary Examiner* — Chau Le

(74) *Attorney, Agent, or Firm* — Schiff Hardin LLP

(57) ABSTRACT

A method for encrypting data stored in a memory area is proposed, wherein the data are encrypted on the basis of a key identification for the data and on the basis of a one-time key.

14 Claims, 1 Drawing Sheet

(56) References Cited

U.S. PATENT DOCUMENTS

| | | | | |
|---|---|---|---|---|
| 2013/0145177 A1* | 6/2013 | Cordella | ............ | G06F 12/1408 |
| | | | | 713/193 |
| 2014/0074719 A1* | 3/2014 | Gressel | ............ | G06Q 20/3827 |
| | | | | 705/64 |
| 2015/0043730 A1* | 2/2015 | Thompson | ............ | H04L 9/0656 |
| | | | | 380/42 |
| 2015/0082399 A1* | 3/2015 | Wu | ............ | G06F 21/6209 |
| | | | | 726/6 |
| 2016/0218867 A1* | 7/2016 | Nordholt | ............ | H04L 9/0852 |

OTHER PUBLICATIONS

Office Action dated Jun. 20, 2016 for German Patent Application No. 102014000986.6.

W. Dankmeier, "(Fast) alled uber Daten-Verschlusselung, Kompression and Fehlerbeseitigung", Seiten 241-249, Auflage Wiesbaden: Springer Jun. 20, 2016.

* cited by examiner

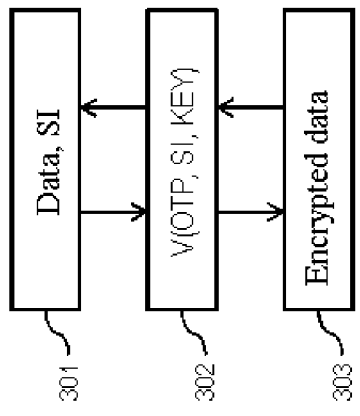
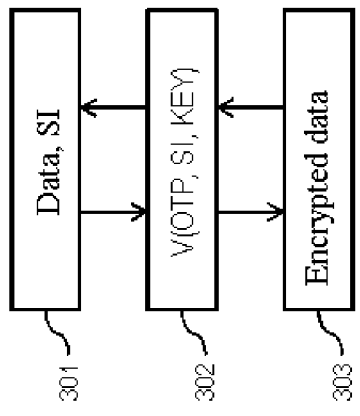
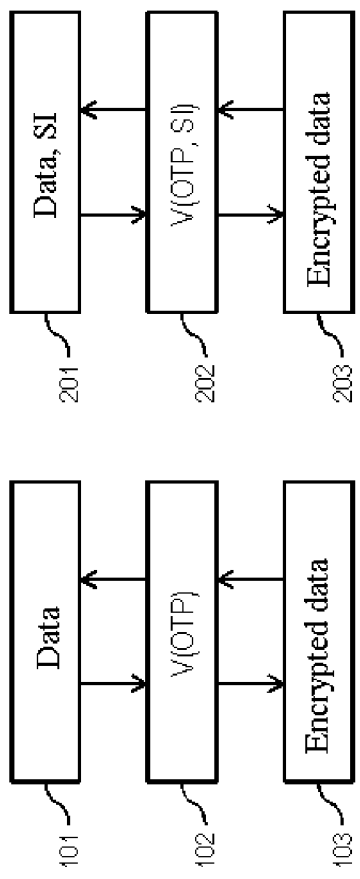
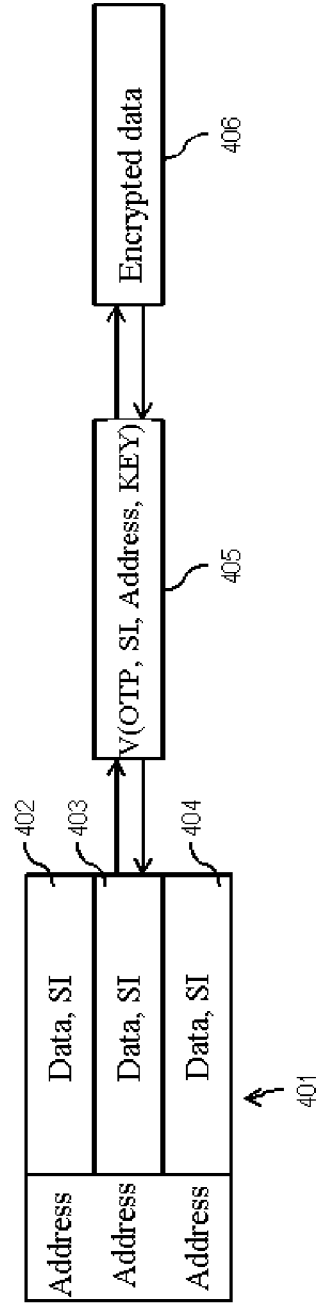

DATA ENCRYPTION OF A STORAGE AREA

BACKGROUND

The disclosure relates to a method and to a device for encrypting data stored in a memory area.

For a multiplicity of applications, a memory content is intended to be stored in an encrypted manner in order to ensure security and confidentiality. By way of example, such applications concern the transmission of data with the participation of the following electronic components: (micro) controller, processors, smartcards, memories, etc.

It is known to encrypt the data to be encrypted by means of a cryptographic arithmetic unit having strong diffusion and nonlinear elements. The encryption often takes place in a plurality of repetitions of operations of the cryptographic arithmetic unit in order to increase the security of the encrypted data.

What is disadvantageous in this case is that such encryption requires a considerable amount of electrical energy since computation is carried out with the data themselves.

Furthermore, the approach is time-consuming since the data have to be present before decryption can be begun.

Furthermore, so-called one-time pads are known. The one-time pad (abbreviation: OTP) serves for secret message communication in the context of a symmetrical encryption method. A key that is (at least) as long as the message itself is used in this case.

FIG. 1 shows by way of example a block diagram illustrating the encryption by means of the OTP. The OTP can be logically combined with data 101 to be protected by means of an XOR operation (exclusive-OR operation) 102, resulting in encrypted data 103. In this case, the calculation of the encrypted data 103 can advantageously take place directly on the original data 101, and the encryption V(OTP) 102 corresponds to an XOR operation, which, if appropriate, can also be performed in a parallelized manner. Accordingly, the decryption can be parallelized by applying the XOR operation with the OTP to the encrypted data.

The use of the OTP is thus more power-efficient and faster than the (complex) cryptographic arithmetic unit outlined above. However, one disadvantage is that the OTP should only be used once, in order to ensure corresponding security. Even using the OTP twice suffices to be able to attack communication with promise of success.

In the case of non-volatile memories (NVM memories), memory areas are written to multiply with different memory contents over time. Therefore, an OTP cannot be used (multiply) for an individual memory area without the cryptographic protection of the stored data being jeopardized.

SUMMARY

The object of the disclosure is to avoid the disadvantages mentioned above and, in particular, to provide an efficient solution for using a one-time key for different memory contents.

This object is achieved in accordance with the features of the independent claims.

Preferred embodiments can be gathered from the dependent claims, in particular.

In order to achieve the object, a method for encrypting data stored in a memory area is proposed,
wherein the data are encrypted on the basis of a key identification for the data and on the basis of a one-time key.

The key identification can constitute a secret. In a different example, the key identification can be publically known. The one-time key is a secret key, for example, which becomes individualizable by means of the key identification. Consequently, from the one secret key a multiplicity of secret keys are generated which are used for the different data stored in the memory area.

In one development, the one-time key is or comprises a one-time pad.

Consequently, the advantages known for one-time pads (parallel and fast processing) can also be used for non-volatile memories, i.e. for a multiplicity of different data in a memory area.

In another development, the key identification is uniquely determined for the stored data.

The key identification can be uniquely (or almost uniquely) determined per allocation of the memory area, that is to say depending on data stored in the memory area.

In one development, in particular, the memory area is a memory area of a non-volatile memory which is erasable by means of an erase operation.

In one development, moreover, the memory area comprises at least one page or at least one sector of the non-volatile memory (NVM).

By way of example, the non-volatile memory can be subdivided into sectors, which are in turn subdivided into pages. The architecture of the non-volatile memory can prescribe that only one page or one sector at a time can be erased. The page comprises a plurality of memory cells, for example, which cannot be erased individually (that is to say independently of the page in which they are arranged).

Furthermore, in one development, after a preceding erase operation of the memory area, the key identification was stored together with the data in the memory area.

In this regard, space for the key identification can be provided in the memory area, which key identification is updated after an erase operation of the memory area. Preferably, during the updating of the key identification, care should be taken to ensure that the latter did not already have an identical value previously for the memory area or for the one-time key.

In the context of an additional development, a dedicated or a unique key identification is determined for the data stored in the memory area. The dedicated or unique key identification can ensure that the data were not encrypted twice on the basis of the same key (that is to say the combination of one-time key and key identification individualizing the latter). In particular, it is possible to ensure that the same key is not used twice (or a number of times) or is so used only with a very low (if appropriate predefinable) probability.

In a next development, a plurality of key identifications for a plurality of memory areas are temporarily stored by means of a buffer memory.

In this regard, a cache can be provided, wherein the access to the cache enables an efficient implementation of read accesses and thus an increased performance of the system.

In one configuration, the key identification is ascertained from a multiplicity of different values which is at least equal to the maximum possible number of erase cycles of the memory area.

In particular, the key identification can have (if appropriate significantly) more values than the possible number of erase cycles. It is preferably ensured that none of the values is used twice for the same memory area in conjunction with the same one-time key.

In an alternative embodiment, the key identification is generated on the basis of a random number or a pseudo-random number, wherein the set of possible random numbers or pseudo-random numbers is large enough that a probability of the same random number being determined twice for the memory area is lower than a predefined threshold value.

This can efficiently minimize the risk of the same key identification being used twice for the same memory area in conjunction with the same one-time key. The random number or the pseudo-random number can be a number which is or was determined by means of a deterministic or nondeterministic method.

In a next configuration, the data are encrypted on the basis of the key identification, the one-time key and a secret.

The operation for encrypting the data can thus use the key identification and also the OTP in order to generate a unique key, wherein a secret key can additionally be used, which can also be part of the operation itself.

In one configuration, moreover, the secret comprises a secret key or a secret encryption operation.

In a further configuration, moreover, the data are decrypted on the basis of the key identification for the data and on the basis of the one-time key (and, if appropriate, the secret).

The explanations concerning the method correspondingly apply to the other categories of claims.

The abovementioned object is also achieved by means of a device for encrypting data stored in a memory area comprising a processing unit, which is designed in such a way that the data can be encrypted on the basis of a key identification for the data and on the basis of a one-time key.

The processing unit specified here can be embodied, in particular, as a processor unit and/or an at least partially hardwired or logical circuit arrangement, which is designed for example in such a way that the method as described herein can be carried out. Said processing unit can be or comprise any type of processor or computer with correspondingly required peripherals (memory, input/output interfaces, input-output devices, etc.).

The above explanations concerning the method correspondingly apply to the device. The device can be embodied in one component or in a distributed manner in a plurality of components.

Moreover, the abovementioned object is achieved by means of a system comprising at least one of the devices described here.

The solution presented here furthermore comprises a computer program product which can be loaded directly into a memory of a digital computer, comprising program code parts suitable for carrying out steps of the method described here.

BRIEF DESCRIPTION OF THE DRAWINGS

The above-described properties, features and advantages of this disclosure and the way in which they are achieved will become clearer and more clearly understood in association with the following schematic description of exemplary embodiments which are explained in greater detail in association with the drawings. In this case, identical or identically acting elements may be provided with identical reference signs for the sake of clarity.

In the figures:

FIG. 1 shows by way of example a block diagram illustrating the encryption by means of the OTP;

FIG. 2 shows an exemplary block diagram illustrating the encryption using an OTP in conjunction with a key identification;

FIG. 3 shows an exemplary block diagram illustrating the encryption using an OTP in conjunction with a key identification and a secret key;

FIG. 4 shows an exemplary block diagram illustrating the encryption of data of an NVM.

DETAILED DESCRIPTION

The solution presented here makes it possible, in particular, to use a one-time key, e.g. in the form of a one-time pad (OTP), for variable data of a non-volatile memory (NVM) and in the process to ensure cryptographic security of the encrypted data. As a result, it is possible to use OTPs flexibly for NVMs and to exploit the advantages of OTPs for NVMs as well.

In an NVM, a contiguous memory area (e.g. a sector of the NVM or a page of the NVM) is erased before (renewed) writing to a memory cell of said memory area is carried out.

It is now proposed, for example, to extend the (contiguous) memory area that is erased in the context of an erase operation by a key identification (e.g. a key identification word or an item of information concerning the key identification). Consequently, the memory area also comprises said key identification. If the memory area is erased, the key identification is also erased. A new value for the key identification can thus be allocated after the erasure of the memory area.

The key identification can be concomitantly taken into account for determing the one-time pad for the memory area. If it is ensured that a key identification not yet used is entered after each erasure of the memory area, then a multiplicity of (genuine) OTPs are obtained for each memory area written to anew.

FIG. 2 shows an exemplary block diagram illustrating the encryption using an OTP in conjunction with a key identification SI. Data together with the key identification SI are situated in a memory area 201. The data are encrypted by means of an operation V in a block (or step) 202, resulting in the encrypted data 203. The operation V is based on the OTP that was extended by the key identification SI. Consequently, the operation V results in a one-time key derived by means of the key identification SI with regard to the respective data. In this case, the key identification SI can be secret. Moreover, the operation V itself can be secret or use a secret as to how the encrypted data 203 are generated from the OTP in conjunction with the key identification SI.

Conversely, the encrypted data 203 can decrypted again by means of the operation V.

By way of example, the key identification can be determined from a multiplicity of different values which is at least equal to the maximum possible member of erase cycles (e.g. approximately 100,000) of the memory area.

Moreover, the key identification can be implemented as a counter. Preferably, care should be taken to ensure that a counter reading already used is not used multiply in conjunction with an OTP (or is so used only with a predefined low probability).

Optionally, a key identification can be used which has a much greater number of different values than the maximum possible number of erase cycles.

Moreover, it is possible for a random number to be stored as a key identification.

Preferably, the random number is chosen to be of sufficient magnitude such that a probability of the same random number being determined twice for the memory area is lower than a predefined limit. This limit or the probability determined thereby can be predefined depending on the cryptographic security respectively required.

The key identification can be stored in a fast buffer memory (cache), for example. The key identifications stored in the buffer memory can be accessed e.g. in a directly mapped manner or associatively. This allows an efficient implementation, without a separate read access to the key identification needing to be carried out before each read access to data of the NVM.

Optionally, the key identifications of the individual memory areas can be publically known. The secret for generating the OTP can be hidden e.g. in an algorithm for creating the OTP on the basis of a plurality of—in part known—parameters. Alternatively (or additionally), the secret for generating the OTP can be a secret master key (KEY) or can at least be based thereon. In the case of publically known key identifications, the latter preferably serve for modification during the OTP generation.

FIG. 3 shows an exemplary alternative block diagram illustrating the encryption using an OTP in conjunction with a key identification SI. Data together with the key identification SI are situated in a memory area 301. The data are encrypted by means of an operation V in a block (or step) 302, resulting in the encrypted data 303. The operation V is based on the OTP that was extended by the key identification SI. In addition, the operation V uses a secret key KEY. Moreover, the operation V itself can be secret or use a secret as to how the encrypted data 303 are generated from the OTP in conjunction with the key identification SI. In particular, the way in which the operation V carries out the encryption of the data on the basis of the OTP and the key identification SI (if appropriate also taking account of the secret key KEY) can be secret in this connection.

Consequently, the operation V results in a one-time key derived by means of the key identification SI with regard to the respective data. The key identification SI can be stored and publicly accessible in the memory area 301 in an unencrypted manner, for example.

Conversely, the encrypted data 303 can be decrypted again by means of the operation V.

The key identification can be stored per memory area, e.g. sector and/or page of the NVM. If an NVM is subdivided into sectors, which are in turn subdivided into pages, a key identification can be stored per sector if the NVM is erased only sector by sector. Moreover, a respective key identification can be stored per page (and, if appropriate, additionally per sector) depending on use or application.

FIG. 4 shows an exemplary block diagram illustrating the encryption of data of an NVM 401. The NVM 401 has three pages 402, 403 and 404, for example, which are addressed in each case by means of a dedicated address. Sectors of the NVM 401 could also be involved instead of the pages.

The individual pages 402 to 404 each comprise data, together with a key identification SI. The key identification SI can be unique for the respective page or it can be unique for the NVM 401. In the latter case, the OPT could be used for the entire NVM and a unique one-time key could be derived for each memory content of each page of the NVM by means of the key identification SI. If there is a dedicated OTP for each page, it suffices if the key identification SI allows the derivation of a unique one-time key for the memory contents of an individual page.

The data of the page 403 are encrypted by means of an operation V in a block (or step) 405, resulting in the encrypted data 406. By way of example, a parameter "address" is additionally used in this operation V in order to ensure that the one-time key used is individualized for each page and for each memory content. In this example, a common OTP can be used for the NVM: as long as the data to be encrypted differ with regard to their address, a one-time key individualized per page is derived as a result and the memory content is furthermore individualized per page by means of the key identification SI.

Optionally, the operation V can use a secret key KEY. Moreover, the operation V itself can be secret or use a secret as to how the encrypted data 406 are generated from the OTP in conjunction with the key identification SI.

Conversely, the encrypted data 406 can be decrypted again by means of the operation V.

Although the disclosure has been described and illustrated more specifically in detail by means of the at least one exemplary embodiment shown, nevertheless the disclosure is not restricted thereto and other variations can be derived therefrom by the person skilled in the art, without departing from the scope of protection of the disclosure.

The invention claimed is:

1. A method for encrypting data stored in a memory area, comprising:
   encrypting the data by a processor in a single iteration on the basis of a unique key identification per allocation of the data to the memory area which is a portion of a memory, and on the basis of a memory address and a one-time key, wherein the memory area is a memory area of a non-volatile memory which is erasable by means of an erase operation and comprises at least one page or at least one sector of the non-volatile memory, and after a preceding erase operation of the memory area, the unique key identification is stored in the memory area together with the encrypted allocated data.

2. The method as claimed in claim 1, wherein the one-time key comprises a one-time pad.

3. The method as claimed in claim 1, wherein the key identification comprises a dedicated key identification determined for the data stored in the memory area.

4. The method as claimed in claim 3, wherein the dedicated key identification is generated on the basis of a random number or a pseudo-random number, wherein the set of possible random numbers or pseudo-random numbers is large enough that a probability of the same random number being determined twice for the memory area is lower than a predefined threshold value.

5. The method as claimed in claim 3, wherein the data are encrypted on the basis of the dedicated key identification, the one-time key and a secret.

6. The method as claimed in claim 5, wherein the secret comprises a secret key or a secret encryption operation.

7. The method as claimed in claim 3, wherein the encrypted data are decrypted on the basis of the key identification and the one-time key.

8. The method as claimed in claim 1, wherein the key identification comprises a unique key identification determined for the data stored in the memory area.

9. The method as claimed in claim 1, wherein a plurality of key identifications for a plurality of memory areas are temporarily stored by means of a buffer memory.

10. The method as claimed in claim 1, wherein the memory area is a sector or page of the memory.

11. A device for encrypting data stored in a memory area comprising a processor configured to encrypt the data in a single iteration on the basis of a unique key identification per allocation of the data to the memory area which is a portion of a memory, and on the basis of a memory address and a one-time key, wherein the memory area is a memory area of a non-volatile memory which is erasable by means of an erase operation and comprises at least one page or at least one sector of the non-volatile memory, and after a preceding erase operation of the memory area, the unique key identification is stored in the memory area together with the encrypted allocated data.

12. The device as claimed in claim 11, wherein the memory area is a sector or page of the memory.

13. A non-transitory computer program product which can be loaded directly into a memory of a digital computer, comprising program code parts suitable for carrying out a method for encrypting data stored in a memory area which is a portion of the memory, wherein the data are encrypted in a single iteration on the basis of a unique key identification per allocation of the data to the memory area, and on the basis of a memory address and a one-time key, wherein the memory area is a memory area of a non-volatile memory which is erasable by means of an erase operation and comprises at least one page or at least one sector of the non-volatile memory, and after a preceding erase operation of the memory area, the unique key identification is stored in the memory area together with the encrypted allocated data.

14. The non-transitory computer program product as claimed in claim 13, wherein the memory area is a sector or page of the memory.

* * * * *